United States Patent
Ramos et al.

(10) Patent No.: US 7,245,204 B2
(45) Date of Patent: Jul. 17, 2007

(54) VEHICLE SECURITY SYSTEM

(75) Inventors: Abigail Z. Ramos, Rolling Meadows, IL (US); Cy M. Fieldman, Chicago, IL (US); Maria L. Mazur, Palatine, IL (US); Vijay S. Raisinghani, Crystal Lake, IL (US)

(73) Assignee: Temic Automotive of North America, Inc., Deer Park, IL (US)

( * ) Notice: Subject to any disclaimer, the term of this patent is extended or adjusted under 35 U.S.C. 154(b) by 169 days.

(21) Appl. No.: 10/955,082

(22) Filed: Sep. 30, 2004

(65) Prior Publication Data

US 2006/0071763 A1  Apr. 6, 2006

(51) Int. Cl.
*B60R 25/10* (2006.01)

(52) U.S. Cl. ............... 340/426.12; 340/426.11; 340/574

(58) Field of Classification Search ........... 340/436.12, 340/426.11, 426, 574, 5.84
See application file for complete search history.

(56) References Cited

U.S. PATENT DOCUMENTS

| | | | |
|---|---|---|---|
| 5,494,130 A * | 2/1996 | Foster ................ | 180/287 |
| 5,539,377 A * | 7/1996 | Dillon ................ | 340/426.11 |
| 5,557,254 A | 9/1996 | Johnson et al. | |
| 5,630,209 A | 5/1997 | Wizgall et al. | |
| 5,635,901 A * | 6/1997 | Weinblatt ........... | 340/426.12 |
| 5,739,749 A * | 4/1998 | Hwang ............... | 340/426.11 |
| 5,835,868 A | 11/1998 | McElroy et al. | |
| 5,874,889 A * | 2/1999 | Higdon et al. ...... | 340/426.36 |
| 6,310,542 B1 | 10/2001 | Gehlot | |
| 6,320,535 B1 | 11/2001 | Hillman et al. | |
| 6,433,683 B1 * | 8/2002 | Robinson ........... | 340/540 |
| 6,442,485 B2 | 8/2002 | Evans | |
| 6,496,111 B1 * | 12/2002 | Hosack .............. | 340/540 |
| 6,542,077 B2 | 4/2003 | Joao | |
| 6,559,769 B2 | 5/2003 | Anthony et al. | |
| 6,717,511 B2 | 4/2004 | Parker, Jr. et al. | |
| 2002/0026266 A1 | 2/2002 | Montague | |
| 2002/0175565 A1 | 11/2002 | Suber et al. | |
| 2003/0169161 A1 | 9/2003 | Brown et al. | |
| 2004/0008103 A1 | 1/2004 | Kady et al. | |
| 2004/0021772 A1 | 2/2004 | Mitchell | |
| 2005/0184858 A1 * | 8/2005 | Griffin et al. ...... | 340/426.11 |

OTHER PUBLICATIONS

Siemens mobile Business Portal—Wireless Modules, "MetaSystem Antiheft/Location", http://www.siemens-mobile.com/cds/frontdoor/0,2241,hg_en_0_44125%3Ap_rArNrNrNr..,Jul. 23, 2004, pp. 1-2.

(Continued)

Primary Examiner—Jeffery Hofsass
Assistant Examiner—Hongmin Fan

(57) ABSTRACT

A system and method is described for alerting authorities during a vehicle carjacking or carnapping. The method includes a first step of providing a vehicular radiotelephone communication system with speech recognition and a controller operable to monitor at least one vehicular system. A next step includes defining at least one predetermined sequence of operation of the at least one vehicular system for triggering a silent alert. The sequence can include spoken words or vehicle control operation. A next step includes monitoring the at least one vehicular system for the defined at least one predetermined sequence, such as a hidden switch activation for example. A next step includes activating a silent alert upon detection of the at least one predetermined sequence.

12 Claims, 1 Drawing Sheet

OTHER PUBLICATIONS

Homeland Security Technology Corporation—Vehicle Location Device, "Products—Wireless Intelligent Mobile Devices", http://www.hstcglobal.com/vld.html, Jul. 23, 2004, pp. 1-2.

ATX—News Archive—Press Release, "ATX Technologies Delivers to Mercedes-Benz First Web-Based In-Car Information Service", http://wwww.atxtechnologies.com/news/pr_merc.asp Mar. 3, 2004, pp. 1-3.

SecurityFocus HOME News: Court limits in-car FBI spying, SecurityFocus News, "Court Limits in-car FBI spying", by Kevin Poulsen, SecurityFocus, Nov. 19, 2003, http://securityfocus.com/news/7491, Mar. 3, 2004, pp. 1-2.

Day, Rebecca: "Mobile, The Integrated Vehicle of the Future", May/Jun. 1999, http://www.ce.org/publications/vision/1999/mayjun/pg14_19.asp?bc=cat&category_id=40, Mar. 3, 2004, pp. 1-5.

* cited by examiner

VEHICLE SECURITY SYSTEM

FIELD OF THE INVENTION

The present invention relates to security systems for vehicles and more specifically, to communicating with authorities from a vehicle for security purposes.

BACKGROUND OF THE INVENTION

There have been increasing occurrences of car thieves assaulting a driver or passenger of a car and forcibly taking the car and abducting the driver or passenger of the car, i.e. "carjacking" or "carnapping". When confronted with such a situation, the abductee desires to escape to safety, or if that is not possible to notify the authorities.

On prior art solution to prevent carjacking is to sound an alarm and/or disable the vehicle through various means at the time of the carjacking. However, this may cause the thief to become angry and attack or harm the driver. Therefore, this solution is not desirable in a carjacking situation. In addition, such prior art systems are known to car thieves and can be disarmed, rendering them ineffective.

Another prior art solution is to use a panic button type of system, wherein a user need only press one button to summon assistance. Such buttons can be obvious or hidden. However, this solution suffers from the same problems as the previous solution. Namely, a car thief will know of this device and can prevent its use by assaulting the driver. Therefore, this solution is also not desirable in a carjacking situation.

What is needed is a method and system that can covertly notify appropriate authorities during a carjacking. It would be desirable if the method and system is configured such that a car thief will not know of the existence or operation thereof.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, wherein:

DETAILED DESCRIPTION OF THE PREFERRED EMBODIMENTS

The present invention provides a method and system that can covertly notify appropriate authorities during a carjacking. The method and system is configured such that a car thief will not know of the existence or operation thereof. In particular, the present invention utilizes a user-defined operational sequence of a vehicular system to trigger an alert call to authorities. Specifically, the user-defined operational sequence can include audio commands spoken to a vehicle speech recognition engine or the operation of particular vehicular controls in a defined sequence. Once the sequence is detected a silent call is placed to authorities over an existing vehicle radio communication device. A vehicle disable function can also be incorporated with the authority alert.

Advantageously, the present invention provides a system and method for a vehicle security system that can be operated with no apparent outward appearance of use. The present invention can be operated at any time during the commission of the carjacking and can protect a user from harm or retaliation from a criminal due to the covert nature of the alert. Optionally, the present invention can allow authorities to listen in to any sound or voices in the cabin of the vehicle, and further gives the option of having the abductee or the authorities disable the vehicle. More specifically, the present invention uses a user-defined coded sequence to covertly activate the authority alert system.

The user-defined coded sequence can be a sequence of words or actions. Preferably, the words or actions would resemble expected words or actions in such a situation that would not arouse the attention of a carjacker. In particular, the sequence of words or actions should not arouse the suspicions of a carjacker, even where the carjacker is keeping close watch over the abductee. The customization of the activation sequences allows the abductee to contact authorities without the realization of the carjacker. This benefit is provided even with the thief's knowledge that such systems even existed.

In one embodiment, the predetermined sequence includes one or two audio phrases that can be recognized by a speech recognition engine in the vehicle. For example, the phrase "Please don't hurt me" followed by the phrase "Where are you taking me?" could be recognized by the speech recognition engine and used to trigger a silent alert to authorities. These are phrases that a carjacker would be expecting to hear and would not alert them to their alternative alerting purpose. In addition, these are phrases that should not arise in normal conversation, preventing a false triggering of the alert.

Figure 1:
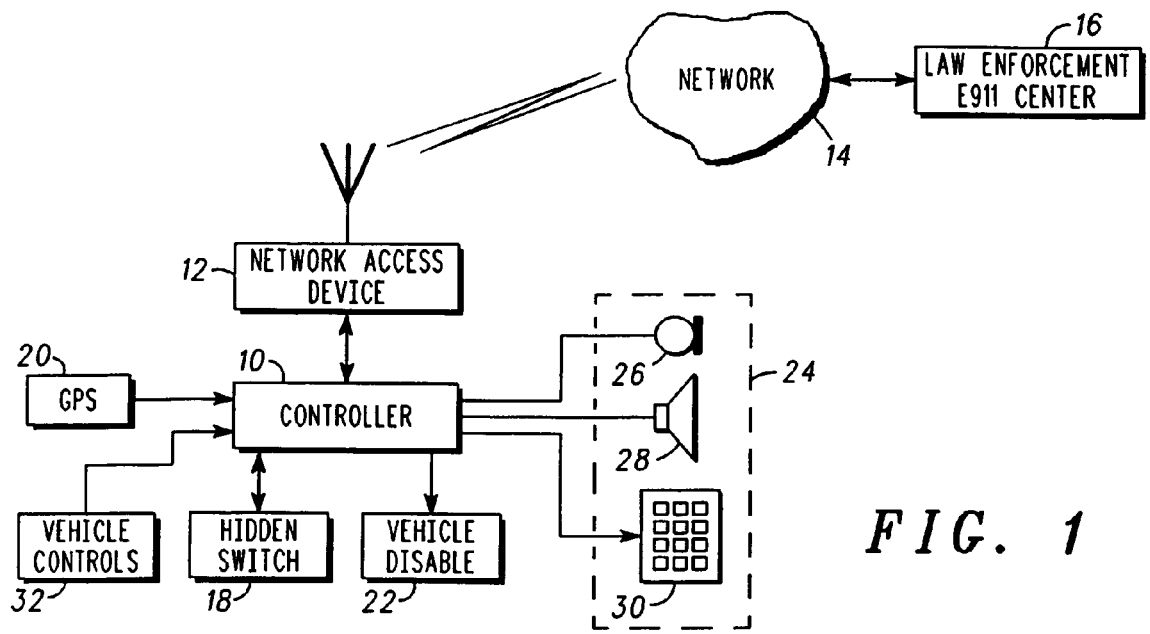
FIG. 1 shows a block diagram of a system overview, in accordance with the present invention.

Referring to FIG. 1, the present invention provides a system for covertly alerting authorities from within a vehicle. The system includes a controller 10 coupled with a microphone 26 and network access device 12 for contacting authorities 16 over a network 14. Preferably, the network access device 12 is associated with an existing Telematics radiotelephone device in the vehicle.

A user interface 24 is provided that is associated with one or more of a Telematics unit, vehicle radio, or can be supplied separately. The user interface 24 can include one or more of the microphone 26, speaker 28, and keypad 30.

One or more hidden switches 18 can be provided in the vehicle wherein a silent alert will not be triggered unless one of the hidden switches is first activated to arm the silent alert system. The hidden switch can be a button, switch, touch pad, coded keystroke on a keypad, sensor, and the like. Preferably, a plurality of hidden switches are provided that are easily accessible from any seat, or the trunk, of the vehicle The controller 10 is coupled to the microphone 26 and network access device 12 (and hidden switch if so provided). The controller has a memory that can store operational sequences, code phrases, procedures, events, predetermined alert messages, emergency telephone numbers, and other information necessary for the operation of the security system.

In a first embodiment, the controller 10 includes a speech recognition engine. Preferably, the controller 10 is associated with an existing Telematics Control Unit (TCU). The speech recognition engine of the controller is trained with predetermined audio sequences by owner/operators of the vehicle. The predetermined sequences are indicators to trigger a silent alert to authorities in the event of a carjacking. For example, two regular operators of a vehicle can each speak and record five phrases (i.e. predetermined audio sequences) into a memory of the speech recognition engine. The particular wording of the phrases can include "Please don't hurt me", "Where are you taking me?", and the like. However, any phrase a user desired can be used to train the speech recognition engine. Any one or more of these phrases can be used to trigger an alert. The speech recognition engine of the controller 10 is operable to compare audio from the microphone 26 with the stored predetermined audio sequences. Upon a match between the audio from the microphone 26 and at least one of the predetermined sequences, the controller triggers a silent alert and directs the network access device 12 to send at least one predetermined message to authorities 16. Preferably, a prerecorded message is associated with each predetermined audio sequence, wherein the controller directs the network access device to send the prerecorded message associated with the predetermined audio sequence to the authorities upon the triggering of a silent alert.

In a second embodiment, operation of the existing controls 32 of the vehicle can be used as the predetermined sequence for triggering an alert. For example, the controller 10 can be used to monitor the accelerator pedal, clutch pedal, brake pedal, wiper controls, lights, radio controls, and the like. When these controls 32 are operated in a predetermined sequence, pre-stored in a memory, the controller 10 generates the trigger to provide the silent alert and call the authorities 16 with a predetermined message. For example, one predetermined sequence could be to take the RPM of the engine to 2000 RPM, press the brake pedal twice and run three cycles of the wiper. The sequence of actions and combinations of these controls (choice of wiper controls, brake pedal, accelerator, clutch pedal, etc.) would be user programmable and stored.

Upon the triggering of the silent alert, the controller 10 can activate a microphone 26 in the vehicle so that sounds and conversations within the cabin of the vehicle can be monitored by the authorities 16, and any audio from the network access device 12 into the vehicle speaker 28 is muted. The input and output audio can be under the control of either or both the controller or the authorities (given the proper access codes). In addition, a prerecorded message in a memory of the controller 10 can be sent to the authorities 16. Preferably, a prerecorded message is associated with each different predetermined sequence in the memory. In this case, different actions can be used to code for sending different messages. Once a particular sequence is detected, the controller can send the prerecorded message associated with the detected predetermined sequence of words or actions to the authorities.

The vehicle also includes a location determination service, such as Global Positioning System (GPS) 20, coupled to the controller 10. The location information can be presented along with the alert message. The location information can also be periodically sent to the authorities in order for the authorities to track the vehicle. This periodic sending of location could be under the control of either the controller 10 or the authorities 16. Alternatively, the controller could determine the location of the vehicle from existing network signal timing solutions for determining a location of a mobile telephone, as is known in the art. In this case, the network service provider can provide the location of the vehicle to law enforcement 16 upon an alert message being received.

Optionally, a disable command can be associated with one of the predetermined sequences to direct the controller to immediately disable the vehicle. For example, the disable command can be used to interrupt fuel flow to the engine or to disable the ignition. Alternatively, the authorities 16 can issue a remote disable command over the network 14 through the network access device 12 directing the controller 10 to disable the vehicle when appropriate or as needed to reduce the potential of harm to the abductee. In either case, it is preferred that, upon disabling the vehicle, the controls could show false, bad or different indication to make the carnapper believe that there is a real problem with the vehicle and not that there is a purposeful intent upon the abductee to disable the vehicle, thereby reducing the agitation of the thief and diverting any retaliation from the abductee. For example, the vehicle controls could show an empty fuel tank or a voltage problem on the vehicle gauges, instead of simply disabling the vehicle while showing normal operational parameters. In this way, a thief may believe there is a real problem with the vehicle instead of the vehicle being purposely disabled.

Figure 2:
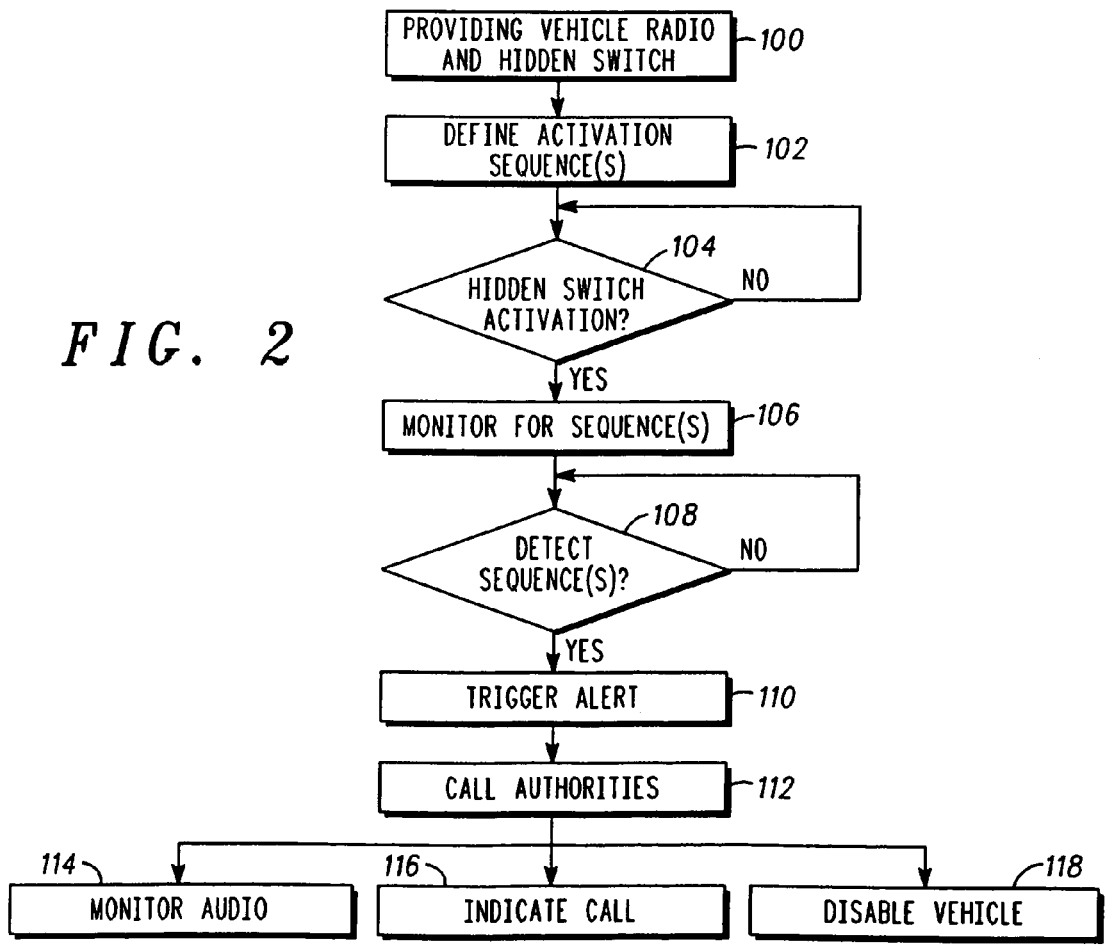
FIG. 2 is a flow chart of a method in accordance with the present invention.

FIG. 2 is a flowchart of a method of covertly alerting authorities from within a vehicle, in accordance with the present invention. The method includes a first step 100 of providing a vehicular radiotelephone communication system with a controller operable to monitor at least one vehicular system. Optionally, at least one hidden switch is provided in a cabin of the vehicle, such that actuation of the switch will trigger the alerting process of the present invention.

A next step 102 includes defining at least one predetermined sequence of operation of the at least one vehicular system for triggering a silent alert. In a first embodiment, the predetermined sequence includes a user speaking a predefined sequence of words. In a second embodiment, the predetermined sequence includes operating at least one of the vehicle controls in a prescribed manner.

A next step 104 includes operating the hidden switch, wherein the remaining steps of the method will not occur until the hidden switch is actuated.

A next step 106 includes monitoring the at least one vehicular system for the defined at least one predetermined sequence. In the first embodiment, this step includes monitoring an audio input from a cabin of the vehicle using a speech recognition system coupled to the controller. In the second embodiment, this step includes monitoring the actuation of vehicle control by the controller. Preferably, two or more sequences are used to reduce the chance of false activation of an alert.

A next step 110 includes triggering a silent alert upon detection 108 of the at least one predetermined sequence, such as a hidden switch activation for example, in the monitoring step 106. Upon triggering the alert, the communication system of the vehicle is activated to call authorities 112. Upon connection of the call, audio from the cabin can be transmitted 114 out to authorities, and audio into the cabin from the communication system of the vehicle is muted. In addition, a prerecorded message can be sent to the authorities. Preferably, a prerecorded message is associated with each different predetermined sequence from the defining step. In this case, different actions can be used to code for sending different messages. Once a particular sequence is detected 108, this step 112 can send the prerecorded message associated with the detected predetermined sequence of words to the authorities. Preferably, a location of the vehicle, determined using techniques known in the art, is sent at least one time during the abduction. Optionally, a disable command 118 can be associated with one of the predetermined sequences to disable the vehicle.

In a preferred embodiment, a silent indication can be given 116 in the cabin of the vehicle to indicate that the authorities are being contacted. The silent indication can be a small light (such as can located as a tiny part of a radio display for example), a sound, or a tactile feedback to the hidden switch, for example. Optionally, the present invention allows the authorities to monitor 114 any audio coming from in the cabin of the vehicle through the radiotelephone microphone. Further, the authorities can issue a command code over the vehicle radiotelephone to disable the vehicle 118.

While the present invention has been particularly shown and described with reference to particular embodiments thereof, it will be understood by those skilled in the art that various changes may be made and equivalents substituted for elements thereof without departing from the broad scope of the invention. In addition, many modifications may be made to adapt a particular situation or material to the teachings of the invention without departing from the essential scope thereof. Therefore, it is intended that the invention not be limited to the particular embodiments disclosed herein, but that the invention will include all embodiments falling within the scope of the appended claims.

What is claimed is:

1. A method of covertly alerting authorities from within a vehicle, the method comprising:
   a user of the vehicle defining and coding into a memory in the vehicle at least one sequence of operation of vehicle controls for triggering a silent alert;
   monitoring an operation of a vehicular system for the at least one user-defined coded sequence of operation of the vehicle controls;
   triggering the silent alert upon detecting that the vehicle controls are operated according to the at least one user-defined coded sequence; and
   activating a radiotelephone communication between the vehicle and at least one authority upon triggering of the silent alert.

2. The method of claim 1, wherein triggering the silent alert includes:
   displaying in the vehicle a false indication of a vehicle problem.

3. The method of claim 1, wherein activating the radio communication between the vehicle and the at least one authority includes:
   transmitting audio from within a cabin of the vehicle to the at least one authority.

4. The method of claim 1, further comprising:
   providing at least one hidden switch within the vehicle; and
   actuating the at least one hidden switch in order to trigger monitoring the operation of the vehicular system for the at least one user-defined coded sequence of operation of the vehicle controls.

5. The method of claim 1, further comprising:
   providing for the user of the vehicle a silent indication in a cabin of the vehicle to indicate that the at least one authority is being contacted.

6. The method of claim 1, wherein activating the radiotelephone communication between the vehicle and the at least one authority includes:
   transmitting from the vehicle to the at least one authority a prerecorded message associated with the at least one user-defined coded sequence of operation of the vehicle controls.

7. The method of claim 1, further comprising:
   receiving at the vehicle a disable command from the at least one authority; and
   disabling the vehicle in response to the disable command.

8. The method of claim 1, further comprising:
   the user of the vehicle defining and coding into the memory in the vehicle at least one audio phrase;
   monitoring audio from within a cabin of the vehicle for the at least one uses-defined coded audio phrase; and
   triggering the silent alert further upon detecting that the audio from within the cabin of the vehicle matches the at least one user-defined coded audio phrase.

9. The method of claim 8, wherein the user of the vehicle defining and coding into the memory in the vehicle the at least one audio phrase includes:
   the user of the vehicle using a speech recognition system disposed in the vehicle to define and code into the memory in the vehicle the at least one audio phrase.

10. The method of claim 8, wherein the at least one user-defined coded audio phrase consists of a sequence of words spoken by the user.

11. A system disposed in a vehicle for covertly alerting authorities from within the vehicle, the system comprising:
    a memory for storing at least one sequence of operation of vehicle controls for triggering a silent alert, the at least one sequence of operation of the vehicle controls defined and coded into the memory by a user of the vehicle;
    a controller coupled with the memory, (i) for monitoring an operation of a vehicular system for the at least one user-defined coded sequence of operation of the vehicle controls that is stored in the memory, and (ii) for triggering the silent alert upon detecting that the vehicle controls are operated according to the at least one user-defined coded sequence; and
    a network access device coupled to the controller, for activating a radiotelephone communication between the vehicle and at least one authority in response to the controller triggering the silent alert.

12. The system of claim 11, further comprising:
    a microphone coupled to the controller, for detecting audio within a cabin of the vehicle, wherein, in response to the controller triggering the silent alert, the network access device transmits the audio from the microphone to the at least one authority.

* * * * *